United States Patent

Stewart et al.

(10) Patent No.: US 9,019,082 B2
(45) Date of Patent: Apr. 28, 2015

(54) SECURITY TAG DETACHER ACTIVATION SYSTEM

(71) Applicant: Sensormatic Electronics, LLC, Boca Raton, FL (US)

(72) Inventors: Justin Stewart, Deerfield Beach, FL (US); Charlie Turgeon, Lighthouse Point, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 108 days.

(21) Appl. No.: 13/770,649

(22) Filed: Feb. 19, 2013

(65) Prior Publication Data

US 2014/0232531 A1   Aug. 21, 2014

(51) Int. Cl.
| G06K 19/07 | (2006.01) |
| G06F 21/34 | (2013.01) |
| E05B 73/00 | (2006.01) |
| G07G 1/00  | (2006.01) |

(52) U.S. Cl.
CPC ............ *G06F 21/34* (2013.01); *E05B 73/0047* (2013.01); *G07G 1/0054* (2013.01)

(58) Field of Classification Search
CPC ........... G08B 13/2402; G08B 13/2434; G08B 13/2454; G06F 21/34
USPC .......... 340/572.1, 572.2, 572.4, 572.8, 572.9, 340/10.5, 10.51, 10.52; 235/380, 381, 383, 235/384
See application file for complete search history.

(56) References Cited

U.S. PATENT DOCUMENTS

| 5,942,978 | A  |   | 8/1999  | Shafer |          |
|-----------|----|---|---------|--------|----------|
| 5,955,951 | A  |   | 9/1999  | Wischerop et al. | |
| 6,225,906 | B1 | * | 5/2001  | Shore  | 340/573.4 |
| 6,801,130 | B2 |   | 10/2004 | Campero | |
| 7,116,228 | B1 | * | 10/2006 | Singleton | 340/572.1 |
| 7,148,805 | B2 |   | 12/2006 | Hogan  | |
| 7,242,304 | B2 |   | 7/2007  | Clancy et al. | |
| 7,336,174 | B1 | * | 2/2008  | Maloney | 340/572.1 |
| 7,450,013 | B2 |   | 11/2008 | Clancy et al. | |
| 7,965,190 | B2 | * | 6/2011  | Maloney | 340/572.4 |
| 8,051,686 | B2 |   | 11/2011 | Garner | |

(Continued)

FOREIGN PATENT DOCUMENTS

| WO | 2005/083655 A2 | 9/2005 |
| WO | 2005124074 A1  | 12/2005 |
| WO | 2008069643 A1  | 6/2008 |

(Continued)

*Primary Examiner* — Van Trieu

(74) *Attorney, Agent, or Firm* — Alan M. Weisberg; Christopher & Weisberg, P.A.

(57) ABSTRACT

A detacher for unlocking a security tag having a locking mechanism is provided. The detacher includes a detaching element in which the detaching element is configured to unlock the locking mechanism if the detaching element is activated. The detacher includes a reader in which the reader is configured to receive a user identifier associated with at least one user. The detacher includes a memory. The memory is configured to store at least one user rule. The detacher includes a processor in which the processor is configured to determine whether the received user identifier meets the at least one user rule. The processor is further configured activate the detaching element if the received user identifier meets the at least one user rule. The detaching element remains deactivated if the received user identifier does not meet the at least one user rule.

16 Claims, 8 Drawing Sheets

(56) References Cited

U.S. PATENT DOCUMENTS

2005/0104733 A1    5/2005  Campero
2006/0080819 A1*  4/2006  McAllister .................. 29/403.3
2009/0237219 A1    9/2009  Berlin et al.

FOREIGN PATENT DOCUMENTS

| WO | 2010135726 A2 | 11/2010 |
| WO | 2012094753 A1 | 7/2012 |
| WO | 2012155989 A1 | 11/2012 |

* cited by examiner

SECURITY TAG DETACHER ACTIVATION SYSTEM

STATEMENT REGARDING FEDERALLY SPONSORED RESEARCH OR DEVELOPMENT n/a

FIELD OF THE INVENTION

The present invention relates to security tag detachers, and in particular to a system and method for activating a security tag detacher.

BACKGROUND OF THE INVENTION

Businesses such as retail stores are constantly looking for ways to minimize retail theft or loss. One common way to minimize retail theft is to attach a security tag to an item such that unauthorized removal of the item can be detected and an alarm generated based on the detection. For example, an acousto-magnetic tag can be attached to an item in which an interrogation signal, typically transmitted at the entrance/exit of a business, will cause the tag to produce a detectable response if an attempt is made to remove the item without first removing the security tag from the item. The security tag has to be removed from the item upon purchase in order to prevent an alarm from being generated.

While security tags help reduce retail theft, improper use of a security tag detacher is an every growing problem that is inhibiting the effectiveness of security tags. For example, a mischievous employee may give customers free merchandise by detaching a security tag and purposely not charging them for items at the point of sale (POS) terminal, thereby allowing the customer to walk out of the business without paying for the items. This practice is known as "sweethearting" and can cost businesses billions of dollars a year.

A customer or thief may also improperly use a security tag detacher when an employee is not watching. For example, a thief may use a security tag detacher that is built into or attached to a POS terminal when the employee is not operating the POS terminal. Furthermore, actually catching the thief in the act is often difficult as the process of detaching a security tag from an article takes seconds.

Attempts have been made to curb sweethearting and other retail theft/loss due to improper use of a security tag detacher. One attempt involves putting a hard lock on the security tag detacher in order to prevent anyone without the key from using the security tag detacher. However, putting a hard lock on a security tag detacher is costly and time consuming as the security tag detacher needs to be constantly locked and unlocked for use. Another method involves using video cameras to monitor each security tag detacher in the store, but monitoring every security tag detacher is impractical as the security tag detachers are distributed throughout the store on different floors of the store. Moreover, monitoring becomes even more difficult during busy hours as security tag detachers are in constant use.

Also, even if monitoring uncovers suspicious employee activity such as sweethearting, proving an employee is involved in the theft is complicated. For example, gathering evidence to back up allegations of suspicious employee behavior is difficult in which the employer will be hard pressed to get enough evidence to actually prove the employee is sweethearting. The employer will have to review video of every instance in which the employee was working in order to determine all the times the accused employee was sweethearting. Such video review can be a very time consuming process and is made even more complicated if the employee worked at different POS terminals.

SUMMARY OF THE INVENTION

The present invention advantageously provides a method and system for activating a security tag detacher.

According to one embodiment, a detacher for unlocking a security tag having a locking mechanism is provided. The detacher includes a detaching element in which the detaching element is configured to unlock the locking mechanism if the detaching element is activated. The detacher includes a reader in which the reader is configured to receive a user identifier associated with at least one user. The detacher includes a processor in which the processor is configured to determine whether the received user identifier meets at least one user rule. The processor is further configured to activate the detaching element if the received user identifier meets the at least one user rule. The detaching element remains deactivated if the received user identifier does not meet the at least one user rule.

According to another embodiment, a system for unlocking a security tag having a locking mechanism is provided. The system includes an authorization device. The authorization device includes a first receiver in which the first receiver is configured to receive a user identifier. The authorization device includes a device memory in which the device memory is configured to store at least one user rule. The authorization device includes a first processor in which the first processor is configured to determine whether the user identifier meets the at least one user rule. The first processor is further configured to cause transmission of a response message. The response message indicates whether the user identifier meets the at least one user rule. The system further includes a detacher that is configured to communicate with the authorization device. The detacher includes a detaching element in which the detaching element is configured to unlock the locking mechanism if the detaching element is activated. The detacher further includes a second receiver in which the second receiver is configured to receive the response message. The detacher further includes a second processor in which the second processor configured to activate the detaching element if the response message indicates the user associated with the user identifier is authorized to use the detaching element. The detaching element remains deactivated if the response message indicates the user associated with the user identifier is unauthorized to use the detaching element.

According to another embodiment, a method for unlocking a security tag having a locking mechanism is provided. A user identifier associated with at least one user is received at a detacher. A determination whether the received user identifier meets at least one user rule is made. A detaching element is activated if the received user identifier meets the at least one user rule. The detaching element is arranged to unlock the locking mechanism.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
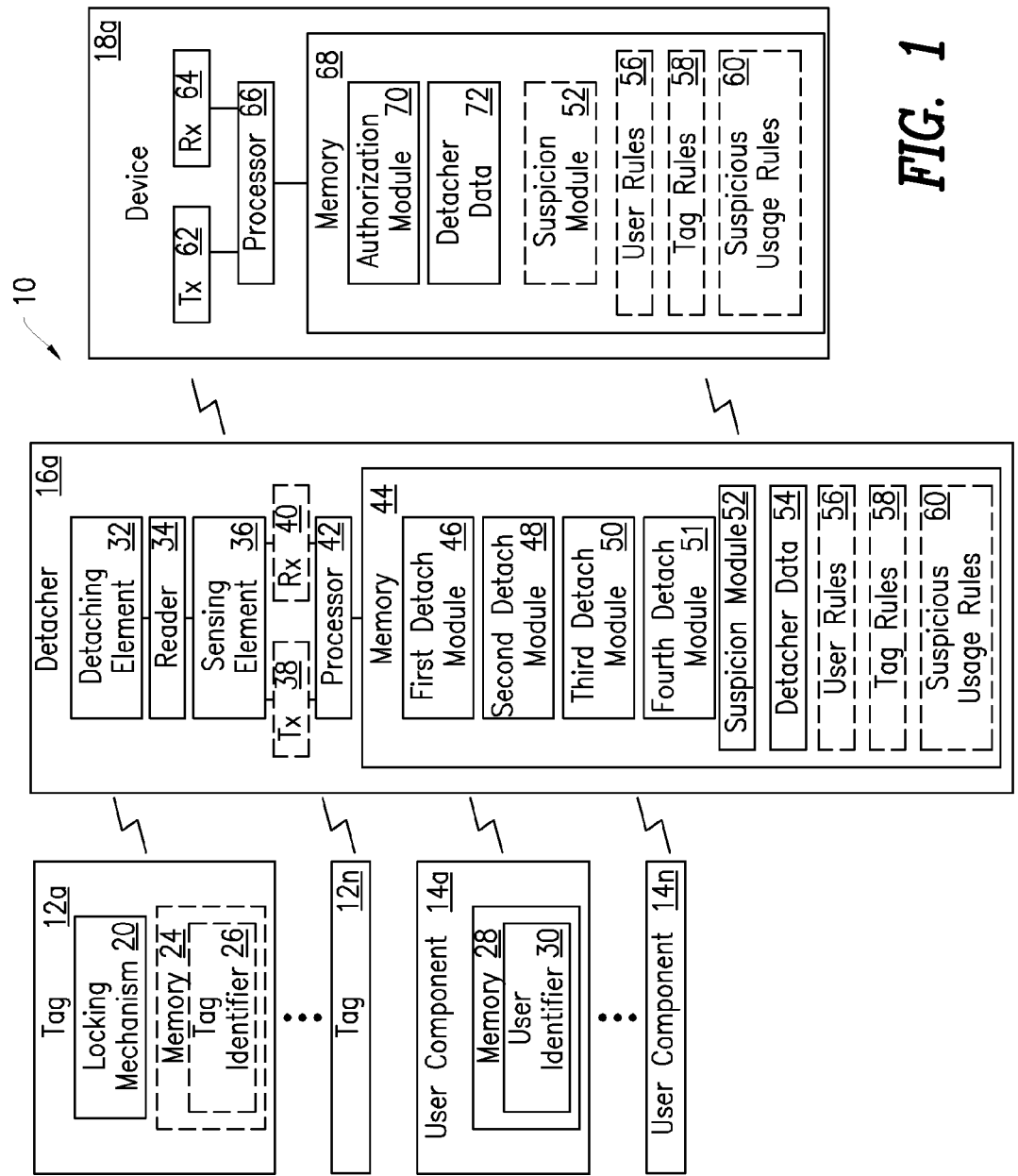
FIG. 1 is a block diagram of an exemplary system constructed in accordance with the principles of the present invention.

The present invention advantageously provides a system, device and method for activating a security tag detacher. Accordingly, the system, device and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to drawing figures in which like reference designators refer to like elements there is shown in FIG. 1 a block diagram of an exemplary security tag system constructed in accordance with the principles of the present invention and designated generally as "10." System 10 includes one or more security tags 12a to 12n (collectively referred to as "tag 12"), one or more user components 14a to 14n ("collectively referred to as "user component 14"), one or more detachers 16a to 16n (collectively referred to as "detacher 16") and one or more authorization devices 18a to 18n (collectively referred to as "device 18").

Tag 12 includes locking mechanism 20 that is arranged to lockingly engage tack 74 (FIG. 2) when tack 74 is removably inserted into tag 12. When locking mechanism 20 is engaged with tack 74, tack 74 is substantially prevented from being removed from tag 12. Locking mechanism 20 may be a magnetic and/or mechanical based locking mechanism, among other locking mechanisms known in the art. In one embodiment, tag 12 is a radio frequency identification ("RFID") tag or a combination electronic article surveillance ("EAS")/RFID tag.

Tag 12 may include memory 24 that stores tag identifier 26 and/or other data associated to tag 12. In particular, memory 24 may include non-volatile and/or volatile memory. For example, non-volatile memory may include a hard drive, flash, memory, memory stick and the like. Also, volatile memory may include random access memory and others known in the art. Tag identifier 26 may be one or more alpha, numeric or alpha-numeric characters for identifying tag 12 such as a radio frequency identification (RFID) identifier. Alternatively, memory 24 and tag identifier 26 may be omitted from tag 12. For example, tag 12 may be an acousto-magnetic tag without memory 24 that includes only an EAS acousto-magnetic element.

User component 14 includes memory 28 that stores user identifier 30. Memory 28 may function substantially the same as corresponding memory 24, with size and performance being adjusted based on design needs. User component 14 can be an RFID or near field communication (NFC) based component that transmits user identifier 30 according to a respective protocol. Alternatively, user component 14 may operate using another type of communication technology that allows user component 14 to communicate stored user identifier 30 to detacher 16 and/or device 18. User identifier 30 may be one or more alpha, numeric or alpha-numeric characters associated with one or more users or employees. User component 14 can be a bracelet, necklace, pin, pendant and the like in which user component 14 can be given to an employee or user authorized to use detacher 16 at the time of employment, assigned at the beginning of a shift or the like.

Figure 2:
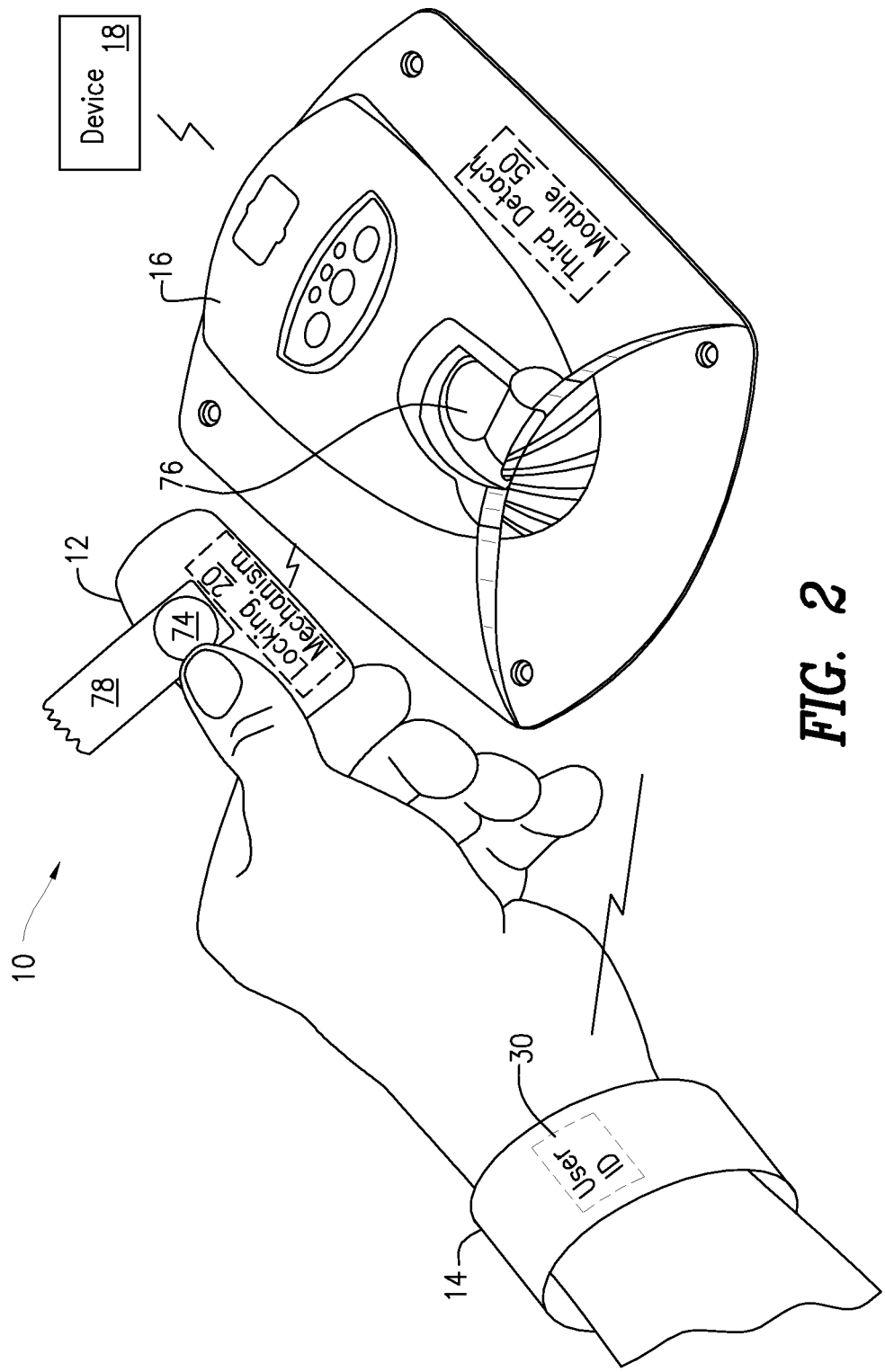
FIG. 2 is a view of an embodiment of system of FIG. 1 constructed in accordance with the principles of the present invention.

Detacher 16 includes detaching element 32 that is configured to unlock locking mechanism 20 if detaching element 32 is activated and tag 12 is removably inserted in receiving portion 76 (FIG. 2). Detaching element 16 is a magnetic and/or mechanical based security tag detacher that allows tack 74 to be removed from tag 12, thereby allowing removal of article 78 (FIG. 2). Detacher 16 also includes reader 34 that is configured to read at least one identifier. For example, reader 34 may be an RFID reader that is arranged to read user identifier 30. In one embodiment, the RFID reader may also read tag identifier 26. In another embodiment, reader 34 may be a near field communication ("NFC") reader arranged to read tag identifier 26 and/or user identifier 30. In another embodiment, reader 34 may be a plurality of readers such as an RFID reader and NFC reader that are configured to read respective identifiers such as from NFC based user component 14 and RFID tag 12. Alternatively, if tag 12 without memory 24 is used, i.e., acousto-magnetic tag, reader 34 may be arranged to read only user identifier 30. The read range of reader 34 for reading tag 12 may be limited such that only inserted tag 12 or tags 12 proximate reader 34 are read. The read range of reader 34 for reading user identifier 30 may be limited to user components 14 proximate detacher 16.

Detacher 16 may include sensing element 36 that is arranged to indicate whether tag 12 is inserted into a receiving portion 76 of detacher 16. Detacher 16 may include one or more transmitters 38 and one or more receivers 40 for communicating with device 18, among other components and devices. Detacher 16 further includes processor 42 in which processor 42 is one or more central processing units (CPUs) for executing computer program instructions stored in memory 44, i.e., device memory. Memory 44 may function substantially the same as corresponding memory 24 and/or 28, with size and performance being adjusted based on design needs. Memory 44 stores first detach module 46, second detach module 48, third detach module 50, fourth detach module 51, suspicion module 52, detacher data 54, user rules 56, tag rules 58 and/or suspicious usage rules 60, among other modules, data and rules.

Figure 3:
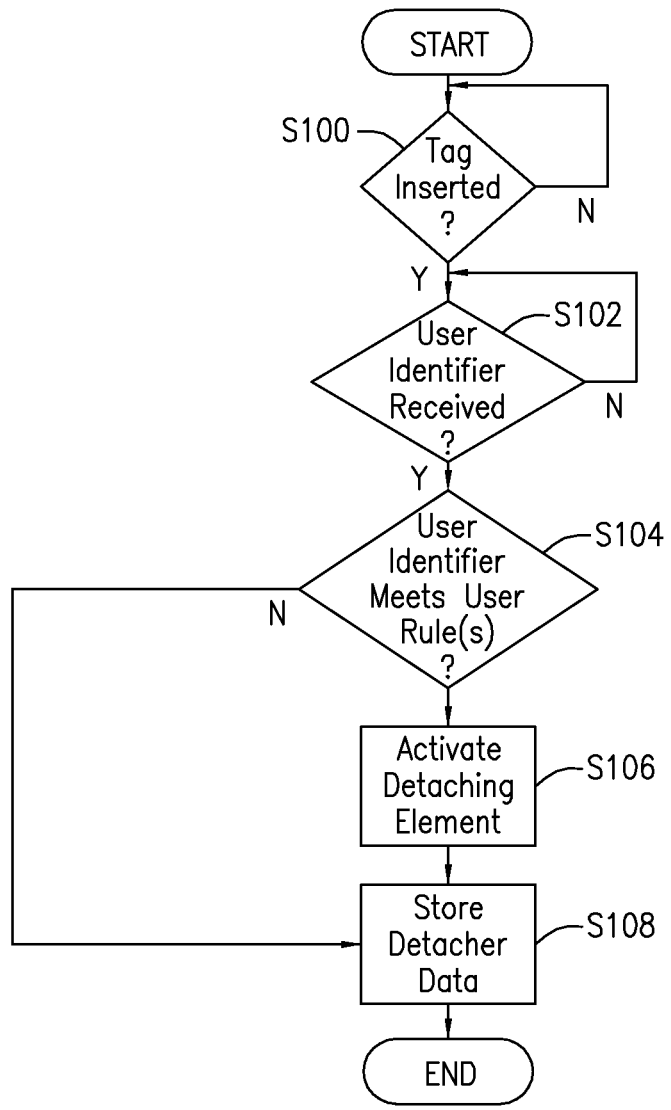
FIG. 3 is a flow chart of an exemplary first detach process according to the principles of the present invention.

First detach module 46 includes instructions, which when executed by processor 42, causes processor 42 to perform the detach process discussed in detail with respect to FIG. 3. Second detach module 48 includes instructions, which when executed by processor 42, causes processor 42 to perform the detach process discussed in detail with respect to FIG. 4. Third detach module 50 includes instructions, which when executed by processor 42, causes processor 42 to perform the detach process discussed in detail with respect to FIG. 5.

Figure 6:
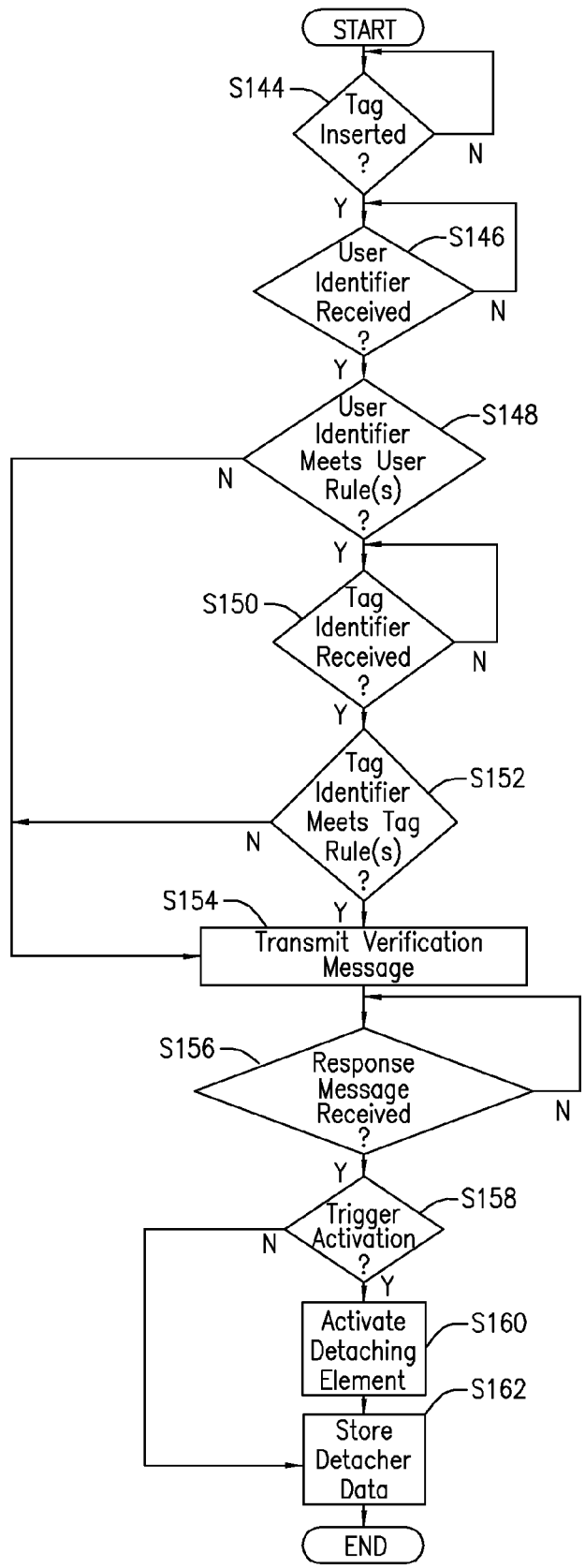
FIG. 6 is a flow chart of a fourth detach process according to the principles of the present invention.

Fourth detach module 51 includes instructions, which when executed by processor 42, causes processor 42 to perform the detach process discussed in detail with respect to FIG. 6. Suspicion module 52 includes instructions, which when executed by processor 42, causes processor 42 to perform the suspicious use process discussed in detail with respect to FIG. 8. Detacher data 54 includes data related to usage of detacher 16. Although FIG. 1 includes first detach module 46, second detach module 48, third detach module 50 and fourth detach module 51, it is understood that an actual implementation need not include all of these modules.

User rules 56 include one or more rules for use by processor 42 to determine whether to trigger activation of detaching element 32. For example, a determination that received user identifier 30 meets one or more user rules 56 may trigger activation of detaching element 32. Tag rules 58 include one or more rules for use by processor 42 to determine whether to trigger activation of detaching element 32. In particular, a determination that one or more tag rules 58 are met may trigger activation of detacher element 32 to thereby allow use/operation of detacher 16. Suspicious usage rules 60 include one or more rules for use by processor 42 to determine whether detacher 16 may be being improperly used by an employee or user. In one embodiment, detaching element 32 may be deactivated to inhibit further use if the determination is made that one or more suspicious usage rules 60 are met. Alternatively, one or more tag rules 58 and/or suspicious usage rules 60 may be omitted from memory 44 based on design need such as if the rules are not being used to make activation/deactivation determinations.

Further, the number of rules that need to be met to trigger activation may be based on design need and/or configured by a user with proper authorization such as a management employee. For example, one or more user rules 56 may includes a plurality of permission level rules in which the plurality of permission level rules includes at least a first permission level rule and second permission level rule. The first permission level rule allows activation of the detaching element 32 and modification of at least one user rule 56, tag rule 58 and/or suspicious usage rule 60, if met. The second permission level rule allows activation of the detaching element and prevents modification of the at least one user rule 56, tag rule 58 and suspicious usage rule 60, if met.

Device 18 includes one or more transmitter 62, one or more receiver 64, processor 66 and memory 68 that may function substantially the same as corresponding components of detacher 16, with size and performance being adjusted based on design needs. Transmitter 62 and receiver 64 are arranged to communicate with detacher 16. Memory 68 includes authorization module 70, detacher data 72, suspicion module 52, user rules 56, tag rules 58 and/or suspicious usage rules 60, among other modules, data and rules. Authorization module 70 includes instructions, which when executed by processor 66, causes processor 66 to perform the authorization process discussed in detail with respect to FIG. 7. Detacher data 72 includes data related to usage of detacher 16. Detacher data 72 is periodically updated to reflect usage of detacher 16, i.e., updated with detacher data 54 from detacher 16. User rules 56, tag rules 58 and/or suspicious usage rules 60 may be omitted from memory 68 based on design needs such as if device 18 is not verifying tag identifier 26 and/or user identifier 30. Device 18 may be a point of sale ("POS") terminal. In one embodiment, if device 18 is a POS terminal, detacher authorization functionality may be omitted from the POS terminal based on design need, i.e., if detacher 16 is making the sole determination whether to activate detaching element 32.

FIG. 2 illustrates an implementation of one embodiment of system 10. Tag 12 is removably insertable into receiving portion 76 of detacher 16. Insertion of tag 12 into receiving portion 76 is used, in part, to trigger activation of detaching element 32 so as to allow removal of tack 74, thereby allowing removal of article 78 from tag 12. Activation of detacher 16 is based at least in part on one of the first detacher process, second detach process, third detach process and fourth detach process depending on the embodiment being deployed and the functionality activated in detacher 16. Detacher 16 may communicate with device 18, e.g., POS terminal, in accordance with the third detach process and fourth detach process discussed in detail with respect to FIGS. 5 and 6. User component 14 may be a wrist band that is arranged to transmit user identifier 30 to detacher 16, i.e., user component 14 is readable by reader 34. Alternatively, user component 14 may be another user wearable, attachable or holdable component that is arranged to transmit user identifier 30 to detacher 16. Article 78 is any item or good to which tag 12 may be removably attached. While only one tag 12, user component 14, detacher 16 and device 18 are illustrated in FIG. 2, it is understood that system 10 may include more than one of one or more of the individual elements, as illustrated in FIG. 1.

An exemplary first detaching process is described with reference to FIG. 3 in which activation of detaching element 32 is based on received user identifier 30. Processor 42 determines whether tag 12 is inserted into receiving portion 76 of detacher 16 (Block S100). For example, processor 42 may determine whether sensing element 36 indicates tag 12 is inserted. If processor 42 determines tag 12 is not inserted, the determination of Block 100 is repeated. If the determination is made that tag 12 is inserted into receiving portion 76, processor 42 determines whether user identifier 30 has been received (Block S102). For example, processor 42 determines whether user identifier 30 has been read from user component 14. If processor 42 determines user identifier 30 has not been received, processor 42 repeats the determination of Block S102.

If processor 42 determines user identifier 30 has been read, i.e., received, processor 42 determines if received user identifier 30 meets one or more user rules 56 (Block S104). For example, one rule in user rules 56 may indicate a minimum user authorization level that must be associated with received user identifier 30, i.e., the minimum user authorization level needed to meet the rule. Another rule in user rules 56 may include determining that user identifier 30 is associated with an active employee such as an employee on active work duty or an employee that is currently employed. Another rule in user rules 56 may include determining whether user identifier 30 matches one of a plurality of verified user identifiers stored in memory 44 in which the rule is met if a match is found. The verified user identifiers are input into memory 44 by a management employee or other person. Another user rule 56 may include determining whether the user associated with receive identifier 30 meets a minimum detacher usage authorization level, i.e., the rule is met if user associated with user identifier 30 has at least the minimum authorization level.

If processor 42 determines user identifier 30 meets one or more user rules 56, processor 42 triggers activation of detaching element 32 (Block S106). Processor 42 causes data associated with activation to be stored as part of detacher data 54 in response to the activation event (Block S108). For example, received user identifier 30, a time user identifier 30 was received, one or more user rules 56 that were met and/or other data related to the activation event may be stored as part of detacher data 54. Referring back to S104, if processor determines user identifier 30 does not met one or more user rules

56, processor 42 cause data associated with the non-activation event to be stored as part of detacher data 54 and the process may end. Alternatively, the process may return to Block S100. Detaching element 32 remains deactivated due to the non-activation event. The first detach process may be implemented in standalone detachers that do not required tags to be read and/or verification of activation such that activation of detaching element 32 is based on received user identifier 30.

Figure 4:
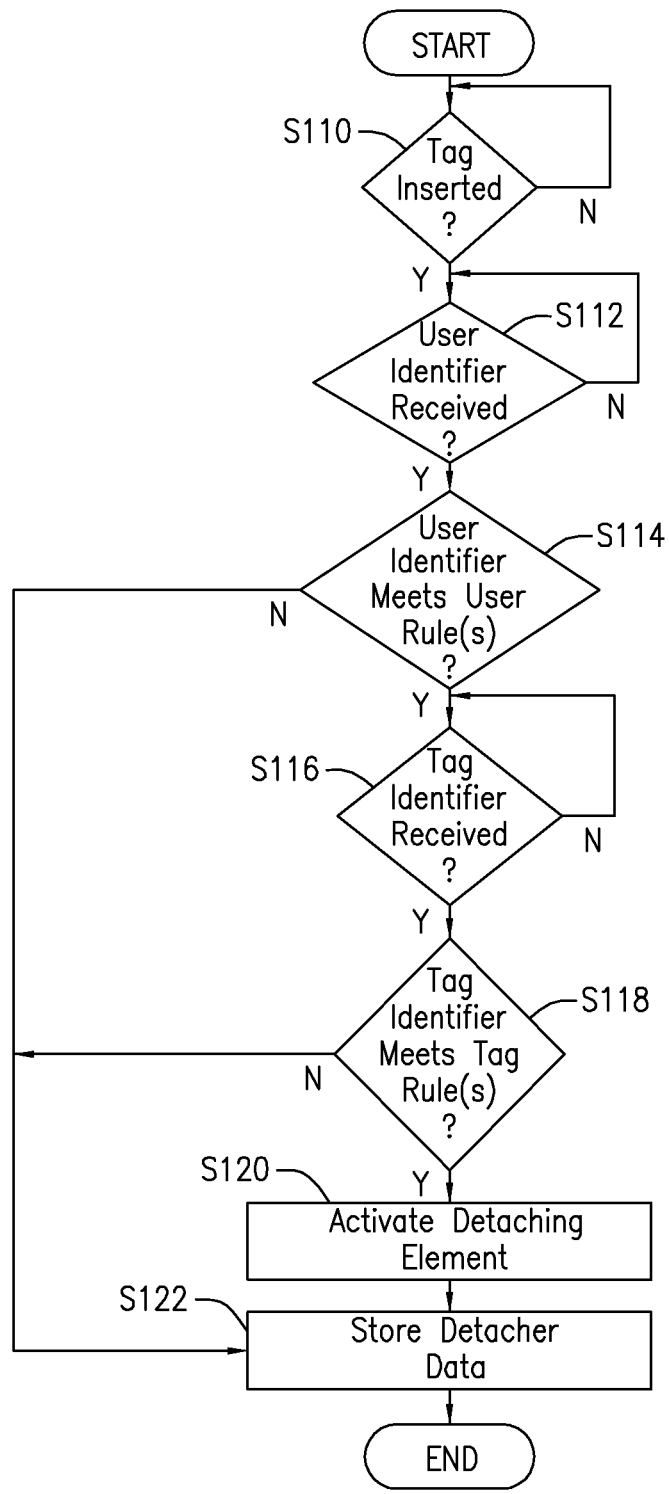
FIG. 4 is a flow chart of an exemplary second detach process according to the principles of the present invention.

An exemplary second detach process is described with reference to FIG. 4. Blocks S110-S114 substantially corresponds to Blocks S100-S104 of FIG. 3. Referring to Block S114, if processor 42 determines user identifier 30 meets one or more user rules 56, processor 42 determines whether tag identifier 26 has been received (Block S116). For example, processor 42 determines whether tag identifier 26 has been read by reader 34. If processor 42 determines tag identifier 26 has not been received, processor 42 repeats the determination of Block S116. If processor 42 determines tag identifier 26 has been received, processor 42 determines whether tag identifier 26 meets one or more tag rules 58 (Block S118). For example, one rule of tag rules 58 includes determining whether tag identifier 26 matches one of a plurality of verified tag identifiers stored in memory 44 in which the rule is met if a match is found. The verified tag identifiers may be input into memory 44 by a management employee or other person with authorized to input the tag identifiers. Another tag rule 58 requires the received tag identifier to have been previously verified. Another rule in tag rules 58 includes determining whether received tag identifier 26 is associated with an article under or over a predefined price. For example, tags 12 that are attached to expensive articles 78, i.e., articles over a predefined price, may require manual detachment by a management employee such that tag identifier 26 will not meet the rule. The number of tag rules 58 used to determine whether to activate detacher 16 may be based on design need and dynamically reconfigured by an employee with authorization, i.e., employee associated with a first permission level.

If processor 42 determines tag identifier 26 meets one or more tag rules 58, processor 42 triggers activation of detaching element 32 (Block S120). Processor 42 causes storage of detacher data 54 associated with the activation event (Block S122). For example, tag identifier 26, user identifier 30, time of activation, time tag identifier 26 was received, rules met, detacher usage and/or time user identifier 30 was received may be stored. Referring back to Block S114, if processor 42 determines tag identifier 26 does not meet one or more tag rules 58, processor 42 does not activate detaching element 32 and causes storage of detacher data 54 associated with user identifier 30 and/or tag identifier 26 (Block S122). For example, detacher data 54 may include the number of time(s) user identifier 30 and/or tag identifier 26 has been received, rules that were not met, among other information associated with the non-activation event. After storage of detacher data 54, the second detach process may end or may alternatively return to Block S110. Detaching element 32 remains deactivated due to the non-activation event. While the second detach process may require additional components and/or processes than first detach process, the second detach process provides added security as one or more tag rules 58 must also be met in order to trigger activation of detaching element 32.

Figure 5:
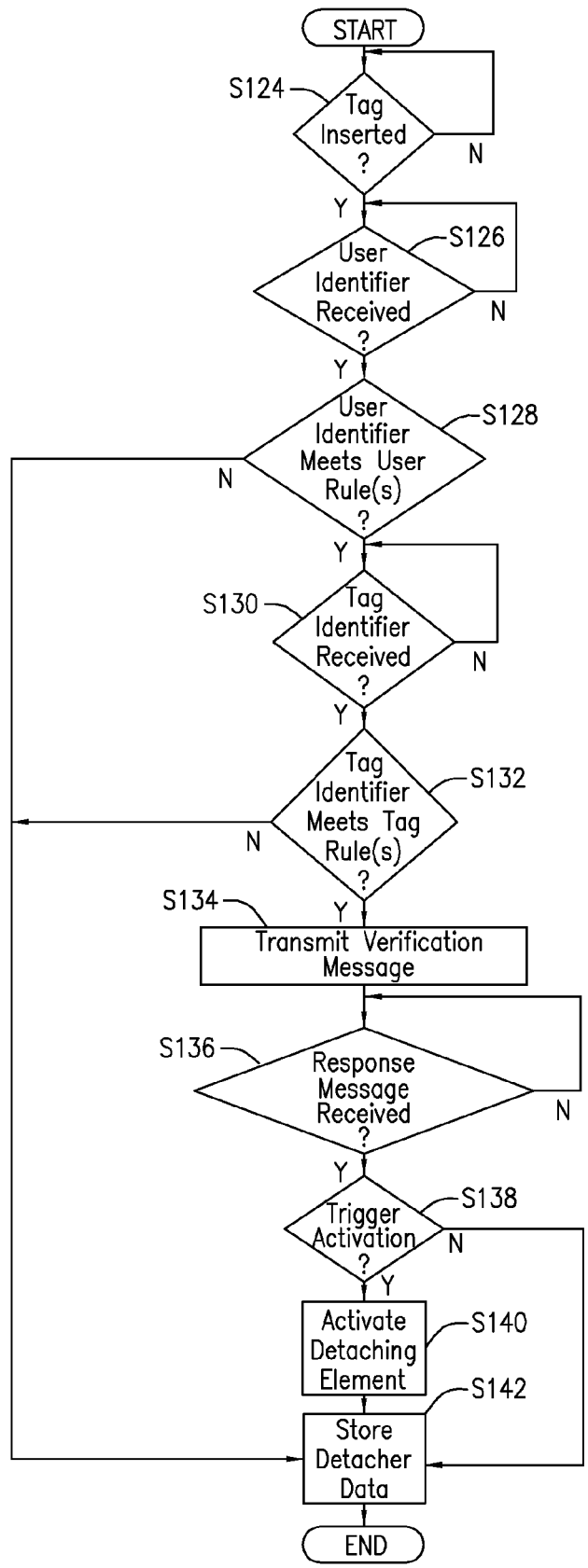
FIG. 5 is a flow chart of an exemplary third detach process according to the principles of the present invention.

An exemplary third detaching process is described with reference to FIG. 5. Blocks S124 to S132 substantially correspond to Blocks S110 to S118. Referring to Block S132, if processor 42 determines tag identifier 26 meets one or more tag rules 58, processor 42 causes a verification message to be transmitted by transmitter 38 to device 18, e.g., POS terminal (Block S134). The verification message indicates activation of detaching element 32 is being requested and that verification of one or more received identifiers is need, i.e., authorization is needed. The verification message may include received user identifier 30 and/or tag identifier 26. After transmitting the verification message to device 18, processor 42 determines whether a response message has been received from device 18 (Block S136).

If processor 42 determines a response message has not been received, processor 42 repeats the determination of Block S136. If processor 42 determines a response message has been received, processor 42 determines whether to trigger activation of detaching element 32 based at least in part on the response message, i.e., whether received identifier(s) were verified and authorization granted (Block S138). For example, processor 42 determines whether the response message indicates authorization has been authorized through verification of the identifiers, i.e., whether the response message indicates to trigger activation of detaching element 32. Response message may indicate authorization is not be granted by device 18 if user identifier 30 and/or tag identifier 26 cannot be verified, i.e., do not meet one or more respective rule stored in memory 68. Furthermore, the determination to trigger activation is based at least in part on detacher 16 determining the received user identifier 30 and/or tag identifier 26 meet the respective rules and the response message. In other words, the response message is used to verify detacher 16's determination that the received identifier(s) meet the respective rules.

If processor 42 determines not to trigger activation detaching element 32, processor 42 causes detacher data 54 associated with the non-activation event to be stored in memory 44 (Block S142). If the response message is not received, processor 42 may assume authorization is not granted or may retransmit the verification message. If processor 42 determines to trigger activation such as if the response message indicates authorization is granted, processor 42 triggers activation of detaching element 32 (Block S140). Processor 42 causes detacher data 54 associated with the activation event to be stored in memory 44 (Block S142). For example, user identifier 30, tag identifier 26, time of activation, item associated with tag identifier 26, rules met, response message and/or other information associated with the activation event may be stored.

A fourth detaching process is described with reference to FIG. 6. Blocks S144 to S154 substantially correspond to Blocks S124 to S134 with several exceptions. One exception is that if user identifier does not meet one or more user rules (Block S148), the fourth detaching process transmits a verification message (Block S154). Another exception is that if tag identifier does not meet one or more tag rules (Block S152), the alternative tag process transmits a verification message including user identifier and/or tag identifier (Block S154). After transmitting a verification message to device 18, processor 42 determines whether a response message has been received (Block S156).

If processor 42 determines a response message has not been received, processor 42 repeats the determination of Block S156. If processor 42 determines a response message has been received, processor 42 determines whether to trigger activation of detaching element 32 based at least in part on the response message, i.e., whether received identifier(s) were verified and authorization granted (Block S158). For example, processor 42 determines whether the response message indicates authorization has been provided through verification of the identifiers, i.e., whether the response message indicates to trigger activation of detaching element 32. Response message may indicate authorization is not be granted by device 18 if user identifier 30 and/or tag identifier 26 cannot be verified, i.e., do not meet one or more respective rule stored in memory 68.

Furthermore, the determination to trigger activation is based at least in part on detacher 16 determining the received user identifier 30 and/or tag identifier 26 meet the respective rules and that response message authorized use of detacher 16 has been received. In other words, the response message is used to verify the determination of detacher 16 that the received identifier(s) meet the respective rules. Furthermore, the indication in the response message as to whether to activate may override detacher 16's previous determination that user identifier 30 and/or tag identifier 26 meet respective rules. For example, if user identifier 30 meets one or more user rules 56 (Block S148) but the response message indicates authorization is unauthorized, processor 42 would not trigger activation as the response message overrides detacher 16's determinations. In another example, processor 42 may trigger activation even though processor 42 determined user identifier 30 does not meet one or more user rules 56 because the response message indicates an authorization to activate. If the response message is not received, processor 42 may assume authorization is not granted or may retransmit the verification message. Transmitting verification message to device 18 even though user identifier 30 and/or tag identifier 26 meet respective rules helps to prevent improper use of detacher 16, i.e., double-checks detacher 16's determination that user identifier 30 and/or tag identifier 26 met respective rules. For example, device 18 may have update rules that have not been downloaded to detacher 16 such that detacher 16's determination may not be in accordance with current rules. In other words, detaching element 32 may still be activated if the response message indicates the user associated with received user identifier 30 is authorized to use detacher 16, even though detacher 16 determined user identifier 30 and/or tag identifier 26 did not meet one or more rules.

If processor 42 determines not to trigger activation detaching element 32, processor 42 causes detacher data 54 associated with the non-activation event to be stored in memory 44. If processor 42 determines to trigger activation such as if the response message indicates authorization is granted, processor 42 triggers activation of detaching element 32 (Block S160). Processor 42 causes detacher data 54 associated with the activation event to be stored in memory 44 (Block S162). For example, user identifier 30, tag identifier 26, time of activation, item associated with tag identifier 26, rules met, response message and/or other information associated with the activation event may be stored. After storage, the fourth detach process may end or may alternatively return to Block S144.

The fourth detaching process helps to prevent improper use of detacher 16 by requesting activation verification from device 18, i.e., double-checks detacher 16's determination that user identifier 30 and/or tag identifier 26 met respective rules. For example, device 18 may have update rules that have not been downloaded to detacher 16 such that detacher 16's determination may not be in accordance with current rules.

Figure 7:
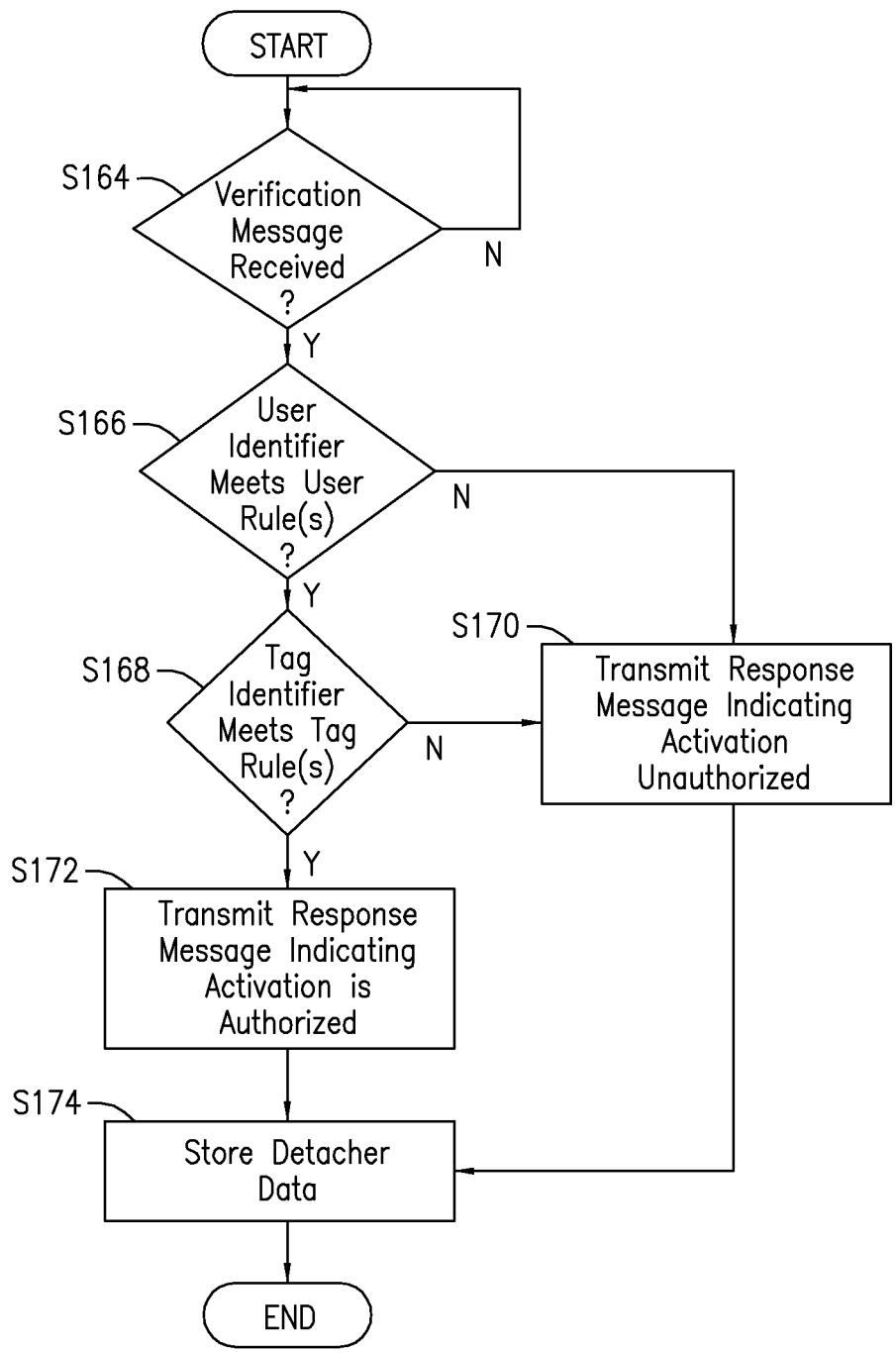
FIG. 7 is a flow chart of an exemplary authorization process according to the principles of the present invention.

An exemplary authorization process is described with reference to FIG. 7. Processor 66 determines whether a verification message has been received (Block S164). The verification message indicates detacher 16 is requesting for device 18 to verify the received user identifier 30 and/or tag identifier 26 meet respective rules, i.e., user rules 56 and/or tag rules 58. The verification message may include user identifier 30 and/or tag identifier 26. If processor 66 determines a verification message has not been received, processor 66 repeats the determination of Block S164. If processor 66 determines a verification message has been received, processor 66 determines whether user identifier 30 received in the verification message meets one or more user rules 56 stored in memory 68 as discussed above with respect to Block S128 but with processor 66 performing the determination(s) (Block S166). User rules 56 in memory 68 may correspond to user rules 56 in memory 44, or may vary from user rules 56 in memory 44 such as if memory 68 contains up-to-date user rules 56. If processor 66 determines that user identifier 30 received in the verification message does not meet one or more user rules 56, processor 66 causes transmitter 62 to transmit response message to detacher 16 indicating activation of detaching element 32 is unauthorized, i.e. received identifier(s) not verified as one or rules were not met (Block S170).

If processor 66 determines user identifier 30 meets one or more user rules 56, processor 66 determines whether tag identifier 26 meets one or more tag rules 58 as discussed above with respect to Block S132 but with processor 66 performing the determination(s) using rules stored in memory 68 (Block S168). One or more tag rules 58 in memory 68 may correspond to one or more tag rules 58 in memory 44, or may vary from one or more tag rules 58 in memory 44 such as if memory 68 contains up-to-date rules. If processor 66 determines tag identifier 26 does not meet one or more tag rules 58, processor 66 causes transmitter 62 to transmit a response message indicting activation of detaching element 32 is unauthorized or not authorized, i.e., not verified as one or more rules were not met Block S170). If processor 66 determines tag identifier 26 meets one or more tag rules 58, processor 66 causes transmitter 62 to transmit a response message indicating activation of detaching element 32 is authorized, i.e., identifier(s) were verified as one or more rules were met (Block S172). Processor 66 causes data associated with the authorization/unauthorization to be stored in memory 68 (Block S174). Block S168 may be omitted based on design need, e.g., device 18 makes the determination to authorize activation of detaching element 32 based on user identifier 30 and not tag identifier 26.

Figure 8:
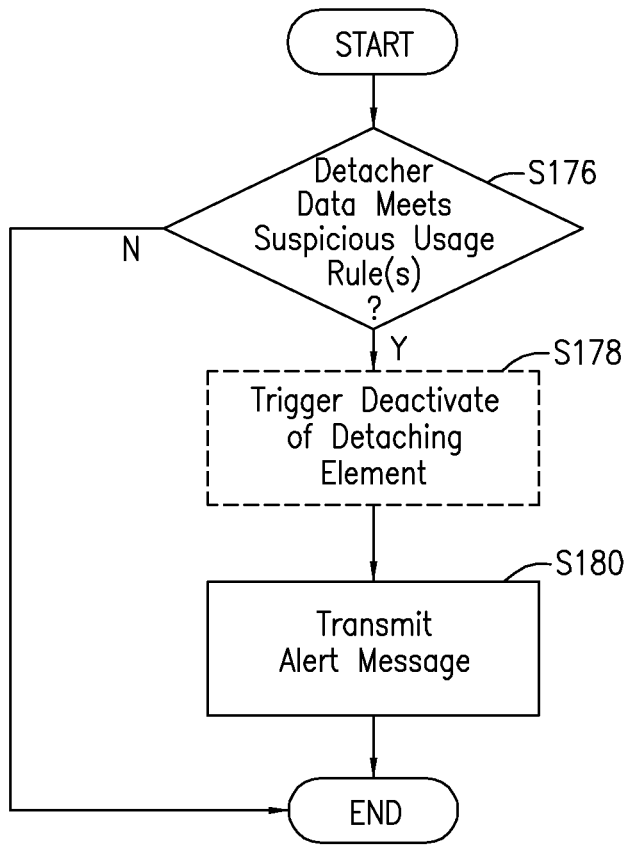
FIG. 8 is a flow chart of an exemplary suspicious usage detection process according to the principles of the present invention.

An exemplary suspicious usage detection process is described with reference to FIG. 8. Processor 42 determines whether detacher data 54 meets one or more suspicious usage rules 54 (Block S176). For example, one suspicious usage rule 60 requires determining the same tag identifier 26 received more than a predefined number of times during a predefined time window. Another suspicious usage rule 60 includes verifying whether user(s) associated with user identifier 30 are an active work duty at the time when user identifier 30 is received or read, i.e., an off duty employee trying to detach tag 12 from article 78 will meet suspicious usage rule 60. If processor 42 determines detacher data 54 does not meet one or more suspicious usage rules 60, the suspicious usage detection process may end. If processor 42 determines detacher data 54 meets one or more suspicious usage rules 60, processor 42 may trigger deactivation of detaching element 32 (Block S178). Alternatively, processor 42 may prevent activation of detaching element 32, i.e., performs the suspicious usage process prior to triggering activation of detaching element 32.

Processor 42 transmits one or more alert messages in response to determining detacher data 54 meets one or more suspicious usage rules 54 (Block S180). The one or more alert messages may notify a management employee of the suspicious use of detacher 16. Alternatively or in addition to notifying a management employee, the one or more alert messages may activate a closed circuit television system, trigger the POS terminal to lock to prevent the transaction, alert at least one portable device and cause POS terminal to trigger visual and/or audible indicators. Processor 42 may also cause detacher to trigger an indicator, e.g., audible or visual, upon the determination detacher data 54 meets one or more suspicious usage rules.

Alternatively, Block S178 may be omitted based on design need such that detaching element 32 is not deactivated based on the detacher data 54 meeting one or more suspicious usage rules 60. The suspicious usage process may be repeated or initiated after detaching element 32 has been activated or just prior to activation, among other times during the detachment process. Alternatively or in addition to processor 42 performing the suspicious usage detection process, the suspicious usage detection process of FIG. 8 may be performed by processor 66 at device 18 using detacher data 54 stored in memory 68 in which the response message may indicate activation is authorized is based at least in part on the suspicious usage detection process, i.e., one or more suspicious usage rules 60 not being met. Alternatively, device 18 can send a deactivation message to detacher 18 during detacher 16 usage to turn off detaching element 32 if one or more suspicious usage rules 60 are met.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A detacher for unlocking a security tag having a locking mechanism, the detacher comprising:
   a detaching element, the detaching element configured to unlock the locking mechanism if the detaching element is activated;
   a reader, the reader configured to receive a user identifier associated with at least one user;
   a memory, the memory configured to store detacher data associated with the received user identifier; and
   a processor, the processor configured to:
      track detacher usage associated with the received user identifier;
      update the detacher data stored in the memory based at least in part on the tracked detacher usage;
      determine whether the detacher data meets at least one suspicious usage rule, the at least one suspicious usage rule indicating detacher usage associated with the receive identifier is suspicious if met;
      determine whether the received user identifier meets at least one user rule; and
      activate the detaching element if the received user identifier meets the at least one user rule and the detacher data does not meet the suspicious usage rule, the detaching element remaining at least temporarily deactivated if at least one of the received user identifier does not meet the at least one user rule and the detacher data meets the suspicious usage rule.

2. The detacher of claim 1, wherein the reader is further configured to read a tag identifier associated with the tag; and
   the processor is further configured to determine whether the tag identifier meets at least one tag rule, the processor activating the detaching element if the tag identifier meets the at least one tag rule, the detaching element remaining at least temporarily deactivated if the tag identifier fails to meet the at least one tag rule.

3. The detacher of claim 2, wherein the at least one tag rule includes a rule for determining whether the received tag identifier is an identifier that has been previously verified.

4. The detacher of claim 1, wherein the reader is further configured to read a tag identifier associated with the tag; and
   the detacher further includes:
      a transmitter, the transmitter configured to transmit the user identifier and tag identifier;
      a receiver, the receiver is configured to receive a response message based at least in part on the transmitted user identifier and tag identifier, the response message indicating whether activation of the detaching element is authorized; and
   the processor activating the detaching element if the response message indicates activation of the detaching element is authorized.

5. The detacher of claim 1, wherein the transmitter is further configured to transmit an alert message if the detacher data meets the at least one suspicious usage rule.

6. The detacher of claim 1, wherein the at least one user rule includes a plurality of permission level rules, the plurality of permission level rules including at least a first permission level rule and second permission level rule;
   the first permission level rule allowing activation of the detaching element and modification of at least one of the user rule, tag rule and suspicious usage rule; and
   the second permission level rule allowing activation of the detaching element and preventing modification of the at least one user rule, tag rule and suspicious usage rule.

7. The detacher of claim 1, wherein the at least one user rule includes at least one rule for determining whether the user associated with the received identifier meets a minimum detacher usage authorization level.

8. A system for unlocking a security tag having a locking mechanism, the system comprising:
   an authorization device, the authorization device including:
      a first receiver, the first receiver configured to receive a user identifier;
      a device memory, the device memory configured to store at least one user rule and detacher data associated with the received user identifier; and
      a first processor, the first processor configured to:
         determine whether the user identifier meets the at least one user rule;
         track detacher usage associated with the received user identifier;
         update the detacher data stored in the memory based at least in part on the tracked detacher usage;
         determine whether the detacher data meets at least one suspicious usage rule, the at least one suspicious usage rule indicating detacher usage associated with the received identifier is suspicious if met; and
         cause transmission of a response message, the response message indicating whether the user identifier meets the at least one user rule and whether the detacher data meets the at least one suspicious usage rule;
   a detacher configured to communicate with the authorization device, the detacher comprising:
      a detaching element, the detaching element configured to unlock the locking mechanism if the detaching element is activated;
      a second receiver, the second receiver configured to receive the response message; and a second processor, the second processor configured to activate the detaching element if the response message indicates the user associated with the user identifier is authorized to use the detaching element and the at least suspicious usage rule is not met; and the detaching element remaining at least temporarily deactivated if the response message indicates at least one of the user associated with the user identifier is unauthorized to use the detaching element and the detacher data meets the at least one suspicious usage rule.

9. The system of claim 8, wherein the first receiver further receives a tag identifier;

the device memory further stores at least one tag rule; and
the first processor is further configured to:
determine whether the tag identifier meets the at least one tag rule, the response message indicating the user associated with the user identifier is authorized to use the detaching element if the tag identifier meets the at least one tag rule.

10. The system of claim 9, the detacher further includes:
a reader, the reader is configured to receive the tag identifier;
a detacher memory, the detacher memory is configured to store the at least one tag rule; and
the second processor is further configured to:
determine whether the received tag identifier meets the at least one tag rule; and
activate the detaching element if the received tag identifier meets the at least one tag rule.

11. The system of claim 8, wherein the second receiver is further configured to receive the user identifier associated with at least one user;

the detacher memory if further configured to store the at least one user rule;
the second processor is further configured to:
determine whether the received user identifier meets the at least one user rule; and
activate the detaching element if the received user identifier meets the at least one user rule.

12. The system of claim 11, wherein the second processor activates the detaching element if the second processor determines the user identifier does not meet the at least one user rule and the response message indicates the user associated with the user identifier is authorized to use the detaching element.

13. The detacher of claim 8, wherein
the transmitter further configured to transmit an alert message when the usage data meets the at least one suspicious usage rule.

14. A method for unlocking a security tag having a locking mechanism, comprising:
receiving, at a detacher, a user identifier associated with at least one user;
storing detacher data associated with the received user identifier;
tracking detacher usage associated with the received user identifier;
updating the detacher data stored in the memory based at least in part on the tracked detacher usage;
determining whether the received user identifier meets at least one user rule;
determining whether the detacher data meets at least one suspicious usage rule, the at least one suspicious usage rule indicating detacher usage associated with the received identifier is suspicious if met; and
activating a detaching element if the received user identifier meets the at least one user rule and the detacher data does not meet the suspicious usage rule, the detaching element arranged to unlock the locking mechanism.

15. The method of claim 14, further comprising:
receiving, at the detacher, a tag identifier associated with a tag; and
determining whether the received tag identifier meets at least one tag rule, the activation of the detaching element occurring if the received tag identifier meets the at least one tag rule.

16. The method of claim 15, further comprising:
transmitting the user identifier and tag identifier; and
receiving a response message based at least in part on the transmitted user identifier and tag identifier, the response message indicating whether activation of the detaching element is authorized, the activation of the detaching element occurring if the response message indicates the activation is authorized.

* * * * *